United States Patent
Beckhoven Van et al.

(10) Patent No.: US 8,986,773 B2
(45) Date of Patent: Mar. 24, 2015

(54) PROCESS FOR THE PREPARATION OF PACKAGED HEAT-PRESERVED AQUEOUS DRINK COMPRISING CASEIN MICELLES AND TRYPTOPHAN-RICH PEPTIDES, AND PRODUCT SO OBTAINED

(75) Inventors: Rudolf Beckhoven Van, Bavel (NL); Arjen Bot, Vlaardineen (NL); Alexander Duchateau, Lanaken (BE); Luppo Edens, JL Rotterdam (NL); Joris Kloek, RK Gouda (NL); Andre L Ross De, TB Delft (NL)

(73) Assignee: DSM IP Assets B.V., Heerlen (NL)

( * ) Notice: Subject to any disclaimer, the term of this patent is extended or adjusted under 35 U.S.C. 154(b) by 621 days.

(21) Appl. No.: 12/989,876

(22) PCT Filed: Apr. 9, 2009

(86) PCT No.: PCT/EP2009/054314
§ 371 (c)(1),
(2), (4) Date: Jan. 14, 2011

(87) PCT Pub. No.: WO2009/132950
PCT Pub. Date: Nov. 5, 2009

(65) Prior Publication Data
US 2011/0165287 A1    Jul. 7, 2011

(30) Foreign Application Priority Data
Apr. 29, 2008  (EP) .................................. 08155385

(51) Int. Cl.
| | | |
|---|---|---|
| A23J 1/00 | (2006.01) | |
| A23L 1/305 | (2006.01) | |
| A23C 9/152 | (2006.01) | |
| A23C 11/08 | (2006.01) | |
| A23L 2/52 | (2006.01) | |
| A23L 2/66 | (2006.01) | |

(52) U.S. Cl.
CPC ............. *A23L 1/3056* (2013.01); *A23C 9/1526* (2013.01); *A23C 11/08* (2013.01); *A23L 1/3053* (2013.01); *A23L 2/52* (2013.01); *A23L 2/66* (2013.01); *A23V 2002/00* (2013.01)
USPC ........................... 426/656; 426/580; 435/68.1

(58) Field of Classification Search
USPC ........................................................ 426/656
See application file for complete search history.

(56) References Cited

U.S. PATENT DOCUMENTS

| | | |
|---|---|---|
| 5,378,488 A | 1/1995 | Dimler et al. |
| 2009/0061064 A1 | 3/2009 | Konda et al. |

FOREIGN PATENT DOCUMENTS

| | | | |
|---|---|---|---|
| JP | 7-194297 | | 8/1995 |
| JP | 2004-536030 | | 12/2004 |
| JP | 2008-507270 | | 3/2008 |
| WO | WO 02/46210 | * | 6/2002 |
| WO | WO 2007/054207 | * | 5/2007 |
| WO | 2007/096962 | | 8/2007 |

OTHER PUBLICATIONS

International Search Report for PCT/EP2009/054314, mailed Oct. 13, 2009.

* cited by examiner

*Primary Examiner* — Elizabeth Gwartney
(74) *Attorney, Agent, or Firm* — Nixon & Vanderhye P.C.

(57) ABSTRACT

A process to prepare packaged pasteurized or sterilized aqueous drinkable products which comprise casein micelles (e.g. from dairy protein) and peptide-fractions, which peptide fractions are rich in tryptophan, and the products so-obtained. The process requires a heat preservation at a specific pH.

16 Claims, No Drawings

PROCESS FOR THE PREPARATION OF PACKAGED HEAT-PRESERVED AQUEOUS DRINK COMPRISING CASEIN MICELLES AND TRYPTOPHAN-RICH PEPTIDES, AND PRODUCT SO OBTAINED

This application is the U.S. national phase of International Application No. PCT/EP2009/054314, filed 9 Apr. 2009, which designated the U.S. and claims priority to European Application No. 08155385.1, filed 29 Apr. 2008, the entire contents of each of which are hereby incorporated by reference.

FIELD OF THE INVENTION

The present invention relates to a process to prepare packaged heat-preserved (e.g. pasteurised or sterilised) aqueous drinkable products which comprise casein micelles (e.g. from dairy products) and peptide-fractions, which peptide fractions are rich in tryptophan, and the products so-obtained.

BACKGROUND OF THE INVENTION

Recently, there have been various reports on the benefit which tryptophan is believed to have on several aspects of human behaviour, mood, brain function, brain development, when such tryptophan is taken up by the brain. Examples of such reports are WO 99/55174, WO 00/42868, WO 2005/023017.

Tryptophan is an amino acid present in many proteins, like e.g. whey proteins, but also animal protein contains tryptophan. Tryptophan can be taken up in the blood, and from the blood into the brain, after ingestion of a protein which contains tryptophan. However, tryptophan is not the only amino acid taken up, and in fact when an average animal protein composition is ingested, the level of tryptophan taken up by the brain is so low due to competitive uptake of other amino acids that usually no significant effect can be observed attributable to tryptophan. Hence, most of the reports referred to above either use proteins or protein-fractions rich in tryptophan, or the free amino acid tryptophan (the latter optionally in combination with other free amino acids and/or proteins).

Use of tryptophan as free amino acids has disadvantages, in that food legislation in many countries limits the use of tryptophan as free amino acid in foodstuffs. Tryptophan-rich proteins have natural limits to the level of tryptophan and its ratio to large neutral amino acids, which is relevant for uptake of tryptophan by the brain.

Recent insight is that peptides rich in tryptophan can be a good source to get sufficient tryptophan in the brain for the desired effects and may be easier applied in foodstuffs than free amino acids. Such peptides rich in tryptophan are preferably low in amino acids with which competition in uptake into the brain is believed to be high: the so-called large neutral amino acids (LNAA), which are: leucine, isoleucine, valine, tyrosine, phenylalanine (and depending on the definition of LNAA one uses also methionine). Hence, it is preferred to make and use peptide preparations which contain a high level of tryptophan and have a high ratio tryptophan/LNAA. Methionine is considered not to have any beneficial metabolic effect in the context of this invention, and is thus for the purpose of this invention not considered as one of the LNAA.

WO 02/46210 describes a method for preparing tryptophan-rich peptides with a ratio tryptophan/LNAA of at least 0.3 on weight basis, by hydrolysis of e.g. alpha-lactalbumin and selective precipitation.

Tryptophan-rich peptide preparations such as e.g. described above can be used in foodstuffs. Such foodstuffs can be dry, like a snack bar, or breakfast cereals, or a powder which can be dispersed/dissolved in a liquid like water or milk to obtain a drinkable product.

There is also a desire to manufacture liquid products containing tryptophan-sources (and preferably a tryptophan-source which is/are a tryptophan-rich peptide fractions, and preferably having a beneficial tryptophan/LNAA ratio) which are e.g. ready to drink (RTD) products as there is an increasing tendency in e.g. Europe to provide functional foods in the form of ready to drink beverages. For reasons of nutrition and/or for ease of formulation into drinks consumed (or likely to be consumed) by children and/or bought by parents to give to their children, presence in such RTD formulation of dairy components like casein micelles is preferred.

In particular, there is a desire for such RTD products which have a mouthfeel and/or texture in the mouth related to or similar to milk, as e.g. such RTD-products can be aimed at children (e.g. schoolchildren aged 6-12) and a product which (at least in mouthfeel and or texture) mimics (to some extent) milk (that is: more like milk than like e.g. a fruit juice or soft drink) is generally accepted by such children and/or their parents as being a nutritious product. Whilst colour and flavour can be made up by colourants and/or flavouring agents (and such is quite common for milk-like health drinks aimed at children, like flavouring with chocolate, banana or strawberry), the mouthfeel of milk or milk-like drinks is a bit more difficult to approach. It also requires that the formation of a sediment is preferably minimised, more preferably avoided. Even though a flavouring may be added, the presence of a cooked off-flavour is preferably avoided.

In addition to the milk-like mouthfeel or texture in the mouth, it is also desired that the RTD is packaged and heat-preserved (e.g. by heat-pasteurisation or heat-sterilisation). In addition to that, it is desired that the product shows minimal sedimentation upon production, and preferably shows no sedimentation at all upon production.

DE 4130284 discloses a process for the preparation of proteins having a high nutritional value. The process discloses hydrolysing whey containing alpha-lactalbumin high in tryptophan and cystein by pepsin, and the resulting product is blended with proteins, such as e.g. casein.

SUMMARY OF THE INVENTION

Hence, there was a desire to develop a RTD (ready to drink) composition rich in tryptophan-comprising peptides, preferably tryptophan-comprising peptides with a favourable tryptophan/LNAA ratio, which RTD is heat-preserved, which contains casein-micelles to mimic or approach the mouthfeel or texture of milk or a milk-like product, and which product shows minimal sedimentation upon heat-preservation (such as heat-pasteurisation or heat-sterilisation) (less than 12% of the proteins sedimenting, preferably less than 6% sedimenting, more preferably free from sedimentation).

Hence, formation of a sediment is preferably avoided or minimised. To achieve such, it was found that the presence of at least 0.5% of casein micelles (when aggregated as they are when in milk) can, at least in part, mimic the mouthfeel and/or texture in the mouth, of milk or a milk-like drink. However, wishing to achieve the desired preservation and/or shelf stability and avoiding the cooked off-flavour, necessitates a heat preservation treatment, preferably by heat-pasterisation or heat-sterilisation, most preferably by an UHT sterilisation treatment.

This was achieved (at least in part) by a process for preparing a packaged, aqueous liquid composition comprising 0.5-4% (dry weight, on total liquid composition) of casein micelles and 0.1-5% (dry weight, on total liquid composition) of tryptophan-containing peptide composition having a level of tryptophan of 1-10% (by weight, on the tryptophan-containing peptides), which process involves the steps of:
- obtaining mixture comprising water (preferably 50-97% by weight based on the total composition), 0.5-4% (dry weight) casein micelles, and 0.1-5% (dry weight) tryptophan-containing peptide composition having a level of tryptophan of 1-10% (by weight, on the tryptophan-containing peptides),
- subjecting said mixture to a heat preservation treatment at a temperature of 80-150° C., preferably 120-150° C.,
- packaging the so-obtained liquid product by aseptic packaging, wherein the mixture subjected to the heat preservation treatment has a pH of below 8.1 and above the pH given by the relationship (in which formula casein micelles is expressed as weight % on total formulation):

$$pH > 0.02 * T(°C.) + 0.23 * (\text{casein micelles in dry weight \%}) + 3.8.$$

The invention furthermore relates to a packaged heat-preserved (preferably heat-pasteurised or heat-sterilised, more preferably heat-sterilised) composition comprising:
- 50-97% (by weight based on the total composition) water,
- 0.5-4% (dry weight, on total liquid composition) of casein micelles,
- 0.1-5% (dry weight, on total liquid composition) of tryptophan-comprising peptide composition having a level of tryptophan of 1-10% (by weight, on the tryptophan-containing peptides), which composition has a pH of 6 to 8.1, preferably 6.2 to 7.5, more preferably of 6.5 to 7.

Preferably, in the process according to this invention, the heat preservation treatment comprises pasteurisation by heat, or sterilisation by heat, and most preferred UHT sterilisation treatment.

There is furthermore a desire for a tryptophan-comprising peptide composition for use in such RTD formulation, which tryptophan-comprising peptide composition has a favourable level of tryptophan and a favourable level of tryptophan/LNAA (LNAA as expressed by the sum of tyrosine, phenylalanine, leucine, isoleucine, and valine), as well as a preparation method for such tryptophan source.

In the RTD formulation according to the present invention, the tryptophan-comprising peptide composition preferably comprises tryptophan-containing peptides which can be obtained by process to produce a composition comprising a water-soluble, tryptophan-comprising peptide, preferably at least two water-soluble, tryptophan-containing peptides, and preferably having a tryptophan/LNAA ratio of more than 0.15, preferably between 0.15 and 1.8, which comprises hydrolyzing lysozyme, preferably hen eggs lysozyme, to prepare a hydrolysate having a DH of between 5 and 45, and optionally removing part of the arginine or lysine containing peptides. Preferably, such tryptophan-comprising peptides for use in the RTD formulation according to the present invention comprises AW or GNW, more preferably AW and GNW. Said hydrolysate has preferably a DH between 10 and 40.

In the RTD formulation according to the present invention, the tryptophan-comprising peptide composition is preferably in the form of a composition comprising at least two different water-soluble peptides and wherein the molar tryptophan/LNAA ratio of the composition is at least 0.15, preferably between 0.15 and 1.8. Preferably this tryptophan-comprising peptide composition comprises AW or GNW, preferably AW and GNW and most preferably AW and GNW whereby the molar ratio of AW to GNW is between 1 to 2 and 10 to 1, preferably between 1 to 2 and 5 to 1. Thus, in the present RTD formulation the tryptophan-comprising peptide composition is preferably in the form of a composition of water-soluble peptides which are rich in tryptophan. Advantageously, in the present RTD formulation the tryptophan-containing peptide composition preferably comprise at least two different di- or tripeptides, whereby two peptides selected from di- or tripeptides are present in an amount of at least 5 mol % of the total amount of di- and tripeptides, and in which tryptophan-comprising peptide composition more than 30 mol %, preferably more than 40 mol %, more preferably more than 50 mol %, even more preferably more than 60 mol %, still more preferably more than 70 mol % and most preferably more than 80 mol % of the peptide-bound tryptophan is present in the form of a di- or a tripeptide, preferably the tryptophan-comprising peptide composition has a tryptophan/LNAA ratio of more than 0.15, preferably between 0.15 and 1.8. By peptide-bound tryptophan is meant a tryptophan which is present as amino acid in a peptide.

The tryptophan-comprising peptide composition which is preferably used in the RTD formulation according to the present invention is preferably a lysozyme hydrolysate or a purified lysozyme hydrolysate. Preferably, said lysozyme hydrolysate is particularly rich in arginine residues. Arginine does not belong to the group large, neutral amino acids (LNAA's) but is known for its insulin stimulating effect. It has been found that the hydrolysate as herein disclosed can generate in vivo high blood plasma tryptophan/LNAA ratios. The tryptophan/LNAA ratios detected in blood plasma, were found to be higher than the tryptophan/LNAA ratio of the hydrolysate. Yet another advantage of the tryptophan-containing peptide composition herein described is that the tryptophan-containing peptides are very small so that even in combination with protein-rich products with less favorable tryptophan/LNAA ratios, the hydrolysate can immediately generate high blood plasma tryptophan/LNAA ratios. This thus makes such tryptophan-containing peptide composition well suitable in the RTD formulations of the present invention. The tryptophan-containing peptide composition as used in the RTD formulation of the present invention may further comprise free tryptophan. Preferably the hydrolysate of the tryptophan-containing peptide composition does not contain more than 1 wt % (on dry matter) of free tryptophan.

DETAILED DESCRIPTION OF THE INVENTION

It is quite surprising that the pH required prior to the heat preservation to avoid the formation of a sediment is dependent not only on the presence or not of casein micelles (or a source thereof), but also on the concentration of such casein micelles. Without wishing to be bound by theory, it is believed that this, and the variables, causes the relative complexity of the pH requirement.

In the process according to the invention the pH of the mixture to be subjected to the heat preservation (like e.g. pasteurisation, sterilisation, e.g. UHT treatment) should be within a certain limit. Depending upon the ingredients chosen, the pH may already by in the desired range, but in many cases it will be desired to adjust the pH of the matter which is to be subjected to heat preservation (e.g. pasteurisation or sterilisation, preferably UHT sterilisation) is adjusted to the value as specified above. Such adjustment can be achieved by any suitable means, e.g. by adding an alkaline or buffering agent to e.g. the mixture to be heat preserved (preferably pasteurised or sterilised, most preferably UHT sterilised), or to one or more of the components used in said mixture, prior to the heat preservation (preferably by heat-pasteurisation or heat sterilisation, most preferably by UHT sterilisation) step. UHT sterilisation is herein to be understood as is known in the art: temperatures in the range of 120-150° C., for sufficient length of time to achieve an $F_0$ value of at least 3, preferably at least 5. Depending upon the concentration of casein micelles and the heat preservation treatment temperature (e.g. UHT conditions), the pH of the mixture subjected to the heat preservation (preferably UHT sterilisation) treatment is preferably between 6.2 to 7.5, preferably to 6.5 to 7.

In the process and product according to the present invention, the composition preferably comprises comprising 0.5-3% (dry weight, on total liquid composition) casein micelles, preferably 0.6-2%.

Also preferred are combinations of a pH of 6.2 to 7.5, preferably to 6.5 to 7 with a concentration of casein micelles of 0.5-3% (dry weight, on total liquid composition) casein micelles, preferably 0.6-2%. In particular preferred in the present invention is a pH of 6.5 to 7 in combination with a concentration of casein micelles of 0.5-2%, even more preferably 0.6-2% (dry weight, on total liquid composition).

In the process and product according to this invention, the composition preferably further comprises 0.01-0.1% (preferably 0.01 to 0.08%, more preferably 0.02 to 0.05%, by weight based on the total composition) of a thickening gum selected from the group consisting of: carrageenan, locust bean gum, guar gum, tara gum, or mixtures thereof, as such may further support the mouthfeel and/or texture in the mouth to be close to milk or dairy products (that is: closer to milk or dairy products than e.g. fruit juices or soft drinks). In this connection, the use carrageenan in said concentrations is most preferred. There is furthermore a preference for the use in the process and composition of this invention of 0.01-0.1% (preferably 0.01 to 0.08%, more preferably 0.02 to 0.05%, by weight based on the total composition) of a thickening gum selected from the group consisting of: carrageenan, locust bean gum, guar gum, tara gum, or mixtures thereof (preferably carrageenan) in combination with a pH of the mixture to be sterilised and/or the RTD formulation of 6.2 to 7.5, preferably to 6.5 to 7 and/or with a concentration of casein micelles of 0.5-3% (dry weight, on total liquid composition) casein micelles, preferably 0.6-2%, and in particular in combination of a pH of 6.5 to 7 (of the mixture to be sterilised and/or the end product) and with a concentration of casein micelles of 0.5-2%, even more preferably 0.6-2 (dry weight, on total liquid composition). In addition to or instead of such use or presence of a gum selected from the group consisting of: carrageenan, locust bean gum, guar gum, tara gum, or mixtures thereof (preferably carrageenan) as set out above, the composition may comprise 0.5-5% (preferably 0.5-3%, more preferably 0.8-2%, by weight based on the total composition) of a starch or starch derivative or starch hydrolysate, preferably maltodextrine. In this, the lower ends of these ranges are more applicable to starch, whereas maltodextrin may be employed over the larger ranges. Presence of starch or a starch derivative or hydrolysate like maltodextrin can be preferred for the same reason as the application of gums as set out above, and in the same combinations with preferred pH ranges and/or casein micelle concentrations.

The casein micelles may be from any suitable source, such as for example from concentrated milk, milk, milk powder, skimmed milk powder, butter milk, butter milk powder, milk protein concentrate, milk protein isolate, and/or mixtures thereof.

The heat-preserved (preferably UHT-treated) product is to be aseptically packaged, which can be in any suitable packaging, preferably such packaging is a Tetrapak, DOY pack (pouch), bottle, bag, or can.

The tryptophan-comprising peptide composition preferably used in the RTD formulation of the present invention provides a composition comprising tryptophan present in peptide form which is very suitable for giving an effective increase of the tryptophan/LNAA ratio in plasma in a very short time interval. The di- and tripeptides comprising tryptophan advantageously contribute to this increase. In one embodiment for the tryptophan-comprising peptide composition in the RTD formulation of the present invention, lysozyme, preferably hen egg lysozyme is enzymatically (pre-)hydrolysed in an industrial process i.e. (hen egg) lysozyme is preferably provided in the form of a hydrolysate. Offered in the form of a hydrolysate, the gastro-intestinal absorption of tryptophan containing peptides is greatly facilitated. In another embodiment, for the tryptophan-comprising peptide composition for the RTD formulation of the present application, hen egg lysozyme is converted into a hydrolysate in which the levels of peptides comprising the positively charged arginine and lysine residues have been lowered. The latter hydrolysates are characterized by molecular tryptophan/LNAA ratios higher than 0.15. In yet another embodiment of the RTD formulation of the present application comprising the preferred tryptophan-comprising peptide composition, hen egg lysozyme is converted to a hydrolysate comprising a peptide population of which more than 50%, preferably more than 60%, more preferably more than 75% of the peptides present have a molecular weight below 500 Da. This with the proviso that the molecular weight distribution of the peptides present in the hydrolysate is carried out as described in the Materials & Methods section of the present application. Regarding the preferred tryptophan/LNAA ratio (of at least 0.15):the amino acid analysis of the hydrolysate is carried out as described in the Materials & Methods section of the present application.

A "protein" or "polypeptide" is defined herein as a chain comprising more than 30 amino acid residues.

A "peptide" or "oligopeptide" is defined herein as a chain of at least two amino acids that are linked through peptide bonds. The terms "peptide" and "oligopeptide" are considered synonymous (as is commonly recognized) and each term can be used interchangeably as the context requires.

A "water-soluble" peptide is a peptide which is soluble in water at a pH of 5.0.

All (oligo)peptide and polypeptide formulas or sequences herein are written from left to right in the direction from amino-terminus to carboxy-terminus, in accordance with common practice. The one-letter code of amino acids used herein is commonly known in the art and can be found in Sambrook, et al. (Molecular Cloning: A Laboratory Manual, $2^{nd}$ ed. Cold Spring Harbor Laboratory, Cold Spring Harbor Laboratory Press, Cold Spring Harbor, N.Y., 1989).

By protein hydrolysate, hydrolysate or hydrolysed protein is meant the product that is formed by enzymatic hydrolysis of the protein, an enriched hydrolysate being a fraction of the protein hydrolysate for example enriched in selected peptides or wherein peptides or polypeptides have been removed from the hydrolysate. So an enriched hydrolysate is preferably a mixture of peptides (or a peptide mixture). The peptide mixture of the invention is therefore a mixture of at least two, preferably at least three, more preferably at least four tryptophan containing peptides. More preferably the mixture comprises a peptide population of which more than 50%, preferably even more than 60%, and most preferably more than 75% of the peptides present have a molecular weight below 500 Da. A tryphophan containing peptide means a peptide which comprises at least one L-tryphophan amino acid residue. The tryptophan/LNAA ratio represents the molar ratio of tryptophan relative to the levels of other Large Neutral Amino Acids (LNAA:, i.e. the sum of tyrosine, phenylalanine, leucine, isoleucine and valine). Except for the plasma tryptophan/LNAA ratio, the tryptophan/LNAA ratio relates only to peptide-bound amino acids. Thus free tryptophan, tyrosine, phenylalanine, leucine, isoleucine and valine are not taken into account in the tryptophan/LNAA ratio.

Peptide-bound amino acids are amino acids which are part of a peptide and not free amino acids.

The Tyr/BCAA ratio represents the molar ratio of tyrosine relative to the levels of branched chain amino acids (BCAA; i.e. the sum of leucine, isoleucine and valine). Preferably the Tyr/BCAA ratio is higher than 0.1, preferably higher than 0.12.

The tryptophan-comprising peptide composition preferably used in the RTD formulation of the present invention can be produced by a process as disclosed herein, and has a tryptophan yield of more than 30% on protein tryptophan basis and generates a water soluble peptide composition comprising tryptophan. The fact that the larger part of the tryptophan residues is encompassed in di- and tripeptides, implies an immediate uptake into the blood stream. Said tryptophan-comprising peptide composition preferably used in the RTD formulation of the present invention may also generate higher blood plasma tryptophan/LNAA ratios than the tryptophan/LNAA ratio of the actual hydrolysate. Finally, the tryptophan-comprising peptide composition preferably used in the RTD formulation of the present invention is also characterized by a very low antigenicity.

In tryptophan-comprising peptide composition preferably used in the RTD formulation of the present invention hen egg lysozyme is preferably used as a convenient substrate for providing preparations with a high tryptophan/LNAA ratio. Lysozyme is present in egg white in a concentration of 3-4%. By taking advantage of its exceptionally high isoelectric point, lysozyme is industrially isolated from egg white using a simple cation chromatographic purification step. The resulting product is almost pure and this industrially available product has a molecular tryptophan content of 7.8% and molecular tryptophan/LNAA ratio of at least 0.15. Thus, pure lysozyme has a tryptophan/LNAA ratio that is significantly higher than pure alpha-lactalbumin and or beta-lactoglobulin. Therefore, the lysozyme hydrolysates for the tryptophan-comprising peptide composition preferably used in the RTD formulation (and thus the tryptophan-comprising peptide composition themselves preferably used in the RTD formulation) of the present invention may have a molar tryptophan/LNAA ratio which is higher than 0.15, more preferably the tryptophan/LNAA ratio is higher than 0.20, even more preferably the tryptophan/LNAA ratio is higher than 0.23, still more preferably the tryptophan/LNAA ratio is higher than 0.25 and most preferably the tryptophan/LNAA ratio is higher than 0.30. In general the molar tryptophan/LNAA ratio is below 3.0. As such lysozyme presents a preferred starting point for tryptophan containing peptides or compositions. Lysozyme (EC3.2.1.17) is an enzyme able to hydrolyse specific peptidoglycan bonds in bacterial cell walls leading to cell lysis.

The hydrolysate preferably used for the tryptophan-comprising peptide composition in the RTD formulation according to the present invention is also effective if incorporated into high protein containing food matrices as presented by, for example, dairy products. This is quite surprising as protein containing food matrices represent high LNAA loads and thus can be expected to reduce the effect of products with high tryptophan/LNAA ratios. A possible explanation for this unexpected phenomenon is that the usual food products incorporate intact, rather than extensively hydrolyzed proteins. The majority of the tryptophan and tyrosine incorporating peptides of the preferred tryptophan-comprising peptide composition has a molecular weight below 500 Da. In view of the very high molecular weight of tryptophan (MW=186) and tyrosine (MW=163) and the fact that only very low levels of free tryptophan are present, the implication is that the majority of these peptides will be tri- or di-peptides.

In a preferred way, the lysozyme, preferably hen egg lysozyme is enzymatically (pre-)hydrolysed in an industrial process i.e. (hen egg) lysozyme is preferably provided in the form of a hydrolysate or an enriched hydrolysate. Offered in the form of such an (enriched) hydrolysate, the intestinal absorption of tryptophan containing peptides is greatly facilitated. In another embodiment of the present application, hen egg lysozyme is converted to a hydrolysate or enriched hydrolysate comprising a tryptophan comprising peptide population of which more than 50%, preferably more than 60%, more preferably more than 75% of the peptides present have a molecular weight below 500 Da. Preferably such an (enriched) hydrolysate does not contain more than 1 wt % (on dry matter) of free tryptophan. The molecular weight analysis of the tryptophan comprising peptides present in the hydrolysate is carried out as described in the Materials & Methods section.

It may further be preferred that for the tryptophan-comprising peptide composition preferably used in the RTD formulation of the present invention the (hen egg) lysozyme hydrolysate is fractionated in order to increase the tryptophan content of a fraction of the hydrolysate. This fraction or enriched hydrolysate has preferably an increased tryptophan/LNAA ratio as compared to the hydrolysate before fractionation. The enrichment of the hydrolysate or enriched hydrolysate with additional free tryptophan, also forms part of the present invention. In a preferred option for preparing such an enriched hydrolysate, use is made of the observation that lysozyme incorporates an unusual high amount of the basic arginine and lysine residues. Surprisingly and as a result of selected enzyme incubation conditions i.e. choosing an endoprotease having the right cleavage preference (such as subtilisin) in combination with incubation conditions that yield a high amount of di- and tri-peptides incorporating tryptophan but almost no arginine or lysine residues, an enriched lysozyme hydrolysate according to the invention can be produced. Thus, LNAA-containing peptides incorporating arginine or lysine residues can be separated from tryptophan containing peptides that do not have such basic residues. For example, by adjusting the pH of the hydrolysate to a value between 4 and 6, more preferably between 5.0 and 5.5, peptides without such a basic residue will have no charge and, therefore, a reduced hydrophilicity. These features can be used e.g. in a chromatographic or another separation process to selectively remove a large proportion of the arginine or lysine containing peptides. As a result, the content of tryptophan-containing peptides is dramatically increased and optionally the tryptophan/LNAA ratio of this enriched hydrolysate. Charged arginine or lysine incorporating peptides can be removed by known techniques such as ion chromatography, hydrophobic interaction chromatography or electrodialysis. A practical background on the use of such characteristics in the chromatographic separation of the relevant peptides, can be found in a.o. the Protein Purification Handbook (issued by Amersham Pharmacia Biotech, nowadays GE Healthcare Bio-Sciences, Diegem, Belgium). In an even more advanced purification route towards preparations that combine a high tryptophan content with a high tryptophan/LNAA ratio, the presence of amino acids with acid side groups such as glutamate (Glu) and aspartate (Asp) residues in lysozyme is advantageously used. In this approach the pH of the lysozyme hydrolysate according to the invention is first adjusted to 3.0 and then chromatographed over a cation resin. At this pH value, peptides incorporating a Glu or Asp will run through the column, other peptides will bind. A subsequent elution with a pH 5 buffer will desorb all bound peptides without a lysine or an arginine residue as described. The majority of the tryptophan containing peptides will be in this desorbed fraction. The remaining bound peptides can then be removed from the column by elution with a buffer with an even higher pH value.

Although for the preparation of the tryptophan-comprising peptide composition preferably used in the RTD formulation of the present invention preferably ion exchange chromatography and/or hydrophobic interaction chromatography are used, other suitable chromatrographic separation methods comprising affinity chromatography and size exclusion chromatography also are available. The recovery of the tryptophan enriched peptides from resulting aqueous fractions can be done by methods that are known in the art. In order to obtain concentrated and shelf stable products, the recovery preferably incorporates an evaporation and (spray) drying step. Also nanofiltration and extraction processes involving organic solvents followed by evaporation/precipitation steps present options for the desired purification. The recovery of the tryptophan enriched peptides from organic solvents is preferably carried out by evaporation of the solvent.

Despite the fact that lysozyme turns out to be highly resistant to proteolytic hydrolysis under physiological conditions, i.e. at an acid pH using pepsin, trypsin and chymotrypsin as proteases, lysozyme hydrolysates as are preferably used in the RTD formulation of the present invention also can be obtained under such less favorable acid conditions. However, under such conditions relatively harsh incubation conditions are required, such as much higher enzyme concentrations, higher temperatures and optionally additional endoproteases. A lysozyme hydrolysate obtained by incubating lysozyme at an alkaline pH with subtilisin was found particularly rich in the Ala-Trp (AW) dipeptide.

Materials and Methods

Materials

Subtilisin under the commercial name of "Protex 6L" was obtained from Genencor (Leiden, The Netherlands), pepsin from Sigma and the mixture of trypsin/chymotrypsin (Porcine PEM) from Novozymes (Bagsvaerd, Denmark). Lysozyme was obtained as Delvozyme L (22% dry matter) from DSM Food Specialties (Delft, The Netherlands).

SDS-PAGE

The purity of the lysozyme preparations used was checked by SDS-PAGE. All materials used for SDS-PAGE and staining were purchased from Invitrogen (Carlsbad, Calif., US). Samples were prepared using SDS buffer according to manufacturers instructions and separated on 12% Bis-Tris gels using MES-SDS buffer system according to manufacturers instructions. Staining was performed using Simply Blue Safe Stain (Collodial Coomassie G250). Prior to hydrolysis the lysozyme appeared as a single band with a molecular weight of approx. 14 kDa on the gel.

LC/MS/MS Analysis

HPLC using an ion trap mass spectrometer (Thermo Electron, Breda, the Netherlands) coupled to a P4000 pump (Thermo Electron, Breda, the Netherlands) was used to determine the presence of tryptophan containing peptides (mainly di- and tri peptides) in the enzymatic protein hydrolysates produced by the process according to the invention. The peptides formed were separated using an Inertsil 3 ODS 3, 3 µm, 150*2.1 mm column (Varian Belgium, Belgium) in combination with a gradient of 0.1% formic acid in Milli Q water (Millipore, Bedford, Mass., USA; Solution A) and 0.1% formic acid in acetonitrile (Solution B) for elution. The gradient started at 100% of Solution A, kept here for 10 minutes, increasing linear to 20% B in 25 minutes and immediately going to the starting conditions, and kept here 15 minutes for stabilization. The injection volume used was 50 microliter, the flow rate was 200 microliter per minute and the column temperature was maintained at 55° C. The protein concentration of the injected sample was approx. 50 micrograms/milliliter. Identification of the peptides of interest is based on the retention time, protonated molecule and by using dedicated MS/MS for the peptides of interest, using optimal collision energy of about 30%. Quantification of specific tryptophan containing peptides is performed by using an external standard method.

The tetra peptide VVPP (M=410.2) was used to tune for optimal sensitivity in MS mode and for optimal fragmentation in MS/MS mode, performing constant infusion of 5 µg/ml, resulting in a protonated molecule in MS mode, and an optimal collision energy of about 30% in MS/MS mode, generating a B- and Y-ion series.

Prior to LC/MS/MS the enzymatic protein hydrolysates were centrifuged at ambient temperature and 13000 rpm for 10 minutes and the supernatant was diluted 1:100 with demineralised water filtered through Millipore water filtration equipment (MilliQ water).

Degree of Hydrolysis

The Degree of Hydrolysis (DH) as obtained during incubation with the various protolytic mixtures was monitored using a rapid OPA test (Nielsen, P. M.; Petersen, D.; Dambmann, C. Improved method for determining food protein degree of hydrolysis. *Journal of Food Science* 2001, 66, 642-646).

Kjeldahl Nitrogen

Total Kjeldahl Nitrogen was measured by Flow Injection Analysis. Using a Tecator FIASTAR 5000 Flow Injection System equipped with a TKN Method Cassette 5000-040, a Pentium 4 computer with SOFIA software and a Tecator 5027 Autosampler the ammonia released from protein containing solutions was quantitated at 590 nm. A sample amount corresponding with the dynamic range of the method (0.5-20 mg N/l) was placed in the digestion tube together with 95-97% sulphuric acid and a Kjeltab subjected to a digestion program of 30 minutes at 200 degrees C. followed by 90 minutes at 360 degrees C. After injection in the FIASTAR 5000 system the nitrogen peak is measured from which the amount of protein measured can be inferred.

Molecular weight distribution of peptides and proteins present in hydrolysates. Analysis of the peptide size distribution of protease treated protein samples was done on an automated HPLC system equipped with a high pressure pump, an injection device able to inject 10-100 microliter sample and a UV detector able to monitor the column effluent at 214 nm.

The column used for this analysis was a Superdex Peptide HR 10/300 GL (Amersham) equilibrated with 20 mM Sodium Phosphate/250 mM Sodium Chloride pH 7.0 buffer. After injecting a sample (typically 50 microliter) the various components were eluted from the column with buffer in 90 min at a flow rate of 0.5 ml/min. The system was calibrated using a mixture of cytochrome C (Mw 13 500 Da), aprotinin (Mw 6510 Da) and tetra-glycine (Mw 246 Da) as molecular weight markers.

Hence, in the process and RTD formulation according to the present invention the tryptophan-comprising peptide composition preferably comprises a peptide composition having a tryptophan to LNAA (weight) ratio of at least 0.1, preferably at least 0.15, more preferably 0.15-1.8, and preferably such is obtained by a process which comprises hydrolysing lysozyme, more preferably hen eggs lysozyme, to prepare a hydrolysate having a DH of between 5 and 45, and optionally removing part of the arginine or lysine containing peptides. In this, the tryptophan-comprising peptide composition preferably comprises AW or GNW, preferably AW and GNW (wherein the molar ratio of AW to GNW is preferably between 1 to 2 and 10 to 1, more preferably between 1 to 2 and 5 to 1).

Regarding the above, it may be further preferred to have in the process and RTD formulation according to the present invention the tryptophan-comprising peptide composition comprises a peptide composition having a tryptophan to LNAA (weight) ratio of at least 0.1, preferably at least 0.15, more preferably 0.15-1.8, and preferably such is obtained by a process which comprises hydrolysing lysozyme (more preferably hen eggs lysozyme, to prepare a hydrolysate having a DH of between 5 and 45, and optionally removing part of the arginine or lysine containing peptides, and/or preferably the tryptophan-comprising peptide composition preferably comprises AW or GNW, more preferably AW and GNW, wherein the molar ratio of AW to GNW is preferably between 1 to 2 and 10 to 1, more preferably between 1 to 2 and 5 to 1), and which may further comprises 0.01-0.1% (preferably 0.01 to 0.08%, more preferably 0.02 to 0.05%, by weight based on the total composition) of a thickening gum selected from the group consisting of: carrageenan, locust bean gum, guar gum, tara gum, or mixtures thereof, as such may further support the mouthfeel and/or texture in the mouth to be close to milk or dairy products (that is: closer to milk or dairy products than e.g. fruit juices or soft drinks). In this connection, the use carrageenan in said concentrations is most preferred.

There is furthermore a preference for the use in the process and composition of this invention of a tryptophan-containing peptide composition which comprises a peptide composition having a tryptophan to LNAA (weight) ratio of at least 0.1, preferably at least 0.15, more preferably 0.15-1.8, and which may be obtained by a process which comprises hydrolysing lysozyme, in combination with a pH of the mixture to be heat-preserved (preferably sterilised) and/or the RTD-formulation of 6.2 to 7.5, preferably to 6.5 to 7 and/or with a concentration of casein micelles of 0.5-3% (dry weight, on total liquid composition) casein micelles, preferably 0.6-2%, and in particular in combination of a pH of 6.5 to 7 and with a concentration of casein micelles of 0.5-2%, even more preferably 0.6-2% (dry weight, on total liquid composition). In addition to or instead of use or presence of a gum selected from the group consisting of: carrageenan, locust bean gum, guar gum, tara gum, or mixtures thereof (preferably carrageenan) as set out above, the composition may further comprise 0.5-5% (preferably 0.5-3%, more preferably 0.8-2%, by weight based on the total composition) of a starch or starch derivative or starch hydrolysate, preferably maltodextrine. In this, the lower ends (0.5-2%) of these ranges are more applicable to starch, whereas maltodextrin may be employed over the larger ranges (0.5-5%). Presence of starch or a starch derivative or hydrolysate like maltodextrin can be preferred for the same reason as the application of gums as set out above.

In the process according to the present invention, and in the RTD according to the present invention, it may be preferred that the tryptophan-comprising peptide preparation comprises at least two different peptides selected from di- or tripeptides, whereby two peptides selected from di- or tripeptides are each present in an amount of at least 5 mol % of the total amount of di- and tripeptides, and in which more than 30 mol % the total tryptophan is present as peptide bound tryptophan, and preferably more than 40 mol %, more preferably more than 50 mol %, even more preferably more than 60 mol %, still more preferably more than 70 mol % and most preferably more than 80 mol % of the peptide-bound tryptophan is present in the form of a di- or a tripeptide, preferably the composition has a tryptophan/LNAA ratio of more than 0.15, preferably between 0.15 and 1.8. In this process and RTD formulation preferably such tryptophan-comprising peptide formulation is preferably obtained by a process which comprises hydrolysing lysozyme (more preferably hen eggs lysozyme, to prepare a hydrolysate having a DH of between 5 and 45, and optionally removing part of the arginine or lysine containing peptides, and/or preferably the tryptophan-comprising peptide composition preferably comprises AW or GNW, more preferably AW and GNW, wherein the molar ratio of AW to GNW is preferably between 1 to 2 and 10 to 1, more preferably between 1 to 2 and 5 to 1).

The invention further relates to a food, pet food, feed, dietary supplement or neutraceutical composition and/or enteral composition comprising the RTD-formulation as herein disclosed.

The following Examples illustrate the invention further.

EXAMPLES

Example 1

Hydrolysing Lysozyme Using Protex and Identity of the Peptides Formed

A solution containing 10% (w/w) pure lysozyme was adjusted to pH 8.2 using NaOH and heated to 52 degrees C. Hydrolysis was started by adding 25 microliter of Protex/g of protein present. Under continuous stirring and maintaining the pH at 8.2, the hydrolysis was continued for 5.5 hours to yield an almost clear solution without a visible precipitate. After a heating step to inactivate the Protex activity, a sample was taken for DH analysis. The DH of the solution turned out to be almost 30%. The heat treated solution was ultrafiltered over a 10 kDa filter to yield a completely clear liquid. This clear liquid was used for LC/MS analysis, for molecular weight distribution of peptides and proteins present as well as for ion exchange chromatography.

To get an impression of the molecular weight distribution of peptides and proteins present, the clear liquid was subjected to a molecular size analysis as described in the Materials & Methods section. The results obtained clearly indicate that almost all peptides incorporating amino acids with an aromatic side chain (i.e. tryptophan, tyrosine and phenylalanine) have a molecular weight below 500 kDa. In view of the high molecular weight of these amino acids, the implication is most of these small peptides are either tri- or dipeptides.

LC/MS analysis was carried out according to the procedure as described in the Materials & Methods section. By selecting for those peptides containing a tryptophan ("W"), peptides AW, GNW, WIR, NAW, WVA, VAW, AWR, SLGNW and minor quantities of WW and SRWW could be detected. The level of free tryptophan in the hydrolysate after incubation was established to represent less than 1% of the total (lysozyme) tryptophan present.

As di- and tripeptides are readily absorbed by peptide transporters present in the intestinal wall, there is little doubt that tryptophan residues present in such peptides will be rapidly absorbed and lead to increased plasma tryptophan levels upon oral intake of the present lysozyme hydrolysate.

Example 2

Increasing the Tryptophan Content of the Hydrolysate

Lysozyme incorporates a surprising high amount of the basic arginine and lysine residues. Furthermore the lysozyme molecule incorporates a significant number of the acid glutamate and aspartate residues. This data has been used to devise an innovative and elegant purification route towards hydrolysates featuring high tryptophan/LNAA ratios. Essential requirement for this purification route is, however, that only very few of the tryptophan residues show up in peptides also containing either an arginine or lysine residue or a glutamate or aspartate residue. As shown in Example 1, the specific hydrolysis route used here yields only few tryptophan containing peptides containing an arginine residue and no peptides containing a lysine, glutamate or aspartate residue.

Theory predicts that a maximal charge difference between peptides with and without a glutamate or aspartate residue can be achieved around pH 3. A maximal charge difference between peptides with and without an arginine or lysine residue, can be achieved around pH 5.

To illustrate the selective power of this approach, a lysozyme hydrolysate was prepared according to the procedure specified in Example 1. Then, the pH of the hydrolysate was adjusted to pH 3.1 using acetic acid and approximately 0.5 gram of protein was applied to a 15 ml bed volume of SP Sepharose FF (GE Healthcare, Diegem, Belgium) column equilibrated with 20 mm sodium citrate pH 3.1. After washing the column with one column volume of the sodium citrate buffer to remove the majority of the peptides incorporating a glutamate or aspartate, the elution buffer was changed to a 20 mm sodium citrate buffer pH 5.1. During washing of the column with three column volumes of the latter buffer, a range of tryptophan containing peptides was eluted. According to LC/MS analysis, the dipeptide AW was present in large amounts as well as the tripeptides GNW, NAW, WVA, VAW and a small amount of the pentapeptide SLGNW. Amino acid analysis of the various pH 5.1 fractions showed that selective pooling yielded a solution having a molecular tryptophan/LNAA ratio of 1.75 and a tryptophan yield of almost 30%. A less selective pooling yielded a solution with a molecular Trp/LNAA ratio of 0.4 and a tryptophan yield of 70%. Subsequently, the column was washed with three column volumes 20 mM sodium citrate pH 7.1. According to the LC/MS data, this step eluted arginine containing peptides WIR, AWIR and, surprisingly, peptide WW. A final washing of the column with 1 M of NaOH, water and 1M of acetic acid prepared the column for a next run.

Example 3

Large Scale Lysozyme Hydrolysis

In larger scale lysozyme hydrolysis procedures, essentially the procedure as described in Example 1 was followed with some minor modifications. A solution containing 7.3% (w/w) pure lysozyme was heated to 65 degrees C. after which the pH was adjusted to pH 8.2 using NaOH. Hydrolysis was started by adding 25 microliter of Protex 6L/g dry matter. Under continuous stirring and maintaining the pH at 8.2 and the temperature at 53 degrees C., the hydrolysis was continued for 2 hours. Then the pH value was increased to 9.0 and incubation was pursued for another 3.5 hours to yield a solution with some precipitate. Then the pH of the solution was lowered to 4.5 and the solution was cooled to below 4 degrees C. To obtain a completely clear product, the liquid was filtered over a Z 2000 filter (Pall) and subsequently excess water and salt was removed via nanofiltration. The resulting concentrate was then subjected to an UHT treatment of 7 seconds at 120 degrees C., evaporated and finally spray dried to obtain the lysozyme hydrolysate in a dry form. The product thus obtained has a molar tryptophan/LNAA ratio of about 0.19.

Example 4

A peptide composition comprising peptides with tryptophan was prepared along the lines as set out in example 3. The product obtained was an aqueous liquid having a peptide level of about 83%, a peptide-bound tryptophan content of about 5.5%, and having a TRP/LNAA ratio of about 0.19. Said product had the appearance of a light yellow powder, and gave, upon dissolving as 1% in water, a solution having a pH of about 4.3.

With the above peptide preparation drinks were prepared having the composition as in table 1 below (ingredients in dry weight % on the water basis, remainder was water), which table also gives the pH of the composition, which was set using sodium hydroxide and citric acid. The process to prepare these compositions was:
 preparing a pre-mix of all ingredients in water (all ingredients other than water were particulate materials),
 stirring such for 10 minutes, and adjusting the pH towards the end of stirring, where desired,
 subject to UHT process
 homogenisation by a high pressure homogeniser
 aseptic filling.

Also, two preparations were made which contained none of the tryptophan-containing peptide preparation, to see the influence (control A and B) of the presence of such. Also, a preparation was prepared having a pH outside the claimed range (Control C).

TABLE 1

| composition and pH example 4. | | | | | | |
|---|---|---|---|---|---|---|
| | Control A | Control B | Ex. 4a | Ex. 4b | Ex. 4c | Control C |
| Peptide preparation containing tryptophan (wt. %) | 0 | 0 | 1.14 | 1.14 | 1.14 | 1.14 |
| Skim milk powder (%) | 2.1 | 2.1 | 4.2 | 2.1 | 2.1 | 10 |
| Carrageenan (wt. %) | 0.02 | 0.02 | 0.02 | 0.02 | 0.02 | 0.02 |
| Maltodextrin (wt. %) | 2.0 | 2.0 | 2.0 | 2.0 | 2.0 | 2.0 |

TABLE 1-continued composition and pH example 4.

|  | Control A | Control B | Ex. 4a | Ex. 4b | Ex. 4c | Control C |
|---|---|---|---|---|---|---|
| Sucrose (wt. %) | 6.6 | 6.6 | 6.6 | 6.6 | 6.6 | 6.6 |
| pH | 6.0 | 7.0 | 7.0 | 6.5 | 7 | 7 |
| Casein micelles content from SMP (wt. %) | 0.84 | 0.84 | 1.68 | 0.84 | 0.84 | 4 |

All these compositions were subjected to in-line UHT (ultra high temperature) sterilisation with heating to 143° C. (+/−1° C.) for about 8 to 8.5 seconds, which is sufficient for an $F_0$ value of 6 to 8.

Directly after the UHT treatment, the products were filled in transparent bottles of 350 ml volume (about 250 ml of liquid), and after 24 hours it was checked if a sediment had formed, and if yes how much (measured in cm, which was calculated to a percentage of the height of the drink in the bottle).

TABLE 2 sediment formed example 4.

|  | Control A | Control B | Ex. 4a | Ex. 4b | Ex. 4c | Control C |
|---|---|---|---|---|---|---|
| Sediment formed (cm) | 0 | 0 | 0.8 | 0.5 | 0 | 3.5 |
| Sediment in % height | 0 | 0 | 10% | 5% | 0 | 30% |

Example 5

A peptide composition comprising peptides with tryptophan was prepared along the lines as set out in example 4, and which was manufactured with the same processing, except for that the UHT treatment was at a lower temperature, of 125° C. (+/−1° C.). The composition of the samples is in table 3.

TABLE 3 composition and pH example 5.

|  | Ex. 5a | Ex. 5b | Ex. 5c | 5d |
|---|---|---|---|---|
| Peptide preparation containing tryptophan (wt. %) | 1.14 | 1.14 | 1.14 | 1.14 |
| Skim milk powder (%) | 4.2 | 2.1 | 2.1 | 10 |
| Carrageenan (wt. %) | 0.02 | 0.02 | 0.02 | 0.02 |
| Maltodextrin (wt. %) | 2.0 | 2.0 | 2.0 | 2.0 |
| Sucrose (wt. %) | 6.6 | 6.6 | 6.6 | 6.6 |
| pH | 7.0 | 6.5 | 7 | 7.0 |
| Casein micelles content from SMP (wt. %) | 1.68 | 0.84 | 0.84 |  |

Sedimentation was checked in the same way as for example 4. The results are set out in table 4.

TABLE 4 sediment formed example 5.

|  | Ex. 5a | Ex. 5b | Ex. 5c | Ex. 5d |
|---|---|---|---|---|
| Sediment formed (cm) | 0 |  | 0 |  |
| Sediment in % height | 0% | 1.1% | 0% | 9.1% |

The invention claimed is:

1. A process for preparing a packaged, aqueous liquid composition comprising 0.5-4%, based on dry weight, on total liquid composition, of casein micelles and 0.1-5% based on dry weight, on total liquid composition, of a tryptophan-containing peptide composition, wherein the tryptophan-containing peptide composition comprises 1-10% by dry weight of tryptophan based on total dry weight of tryptophan-containing peptides in the tryptophan-containing peptide composition, wherein the process comprises the steps of:

(a) obtaining an aqueous liquid composition comprising an aqueous mixture of (i) 50-97% by weight of water based on total composition weight, (ii) 0.5-4% based on dry weight of casein micelles, (iii) 0.1-5% based on dry weight of a tryptophan-containing peptide composition, wherein the tryptophan-containing composition comprises 1-10% by dry weight of tryptophan based on total dry weight of tryptophan-containing peptides in the tryptophan-containing composition, and (iv) 0.5-5% by weight based on total composition of a starch component which is at least one selected from the group consisting of starch derivatives and starch hydrolysates, (b) subjecting the aqueous mixture of step (a) to a heat preservation treatment at a temperature of 80-150° C. to obtain an aqueous liquid product, and (c) packaging the aqueous liquid product obtained in step (b) by aseptic packaging, wherein the aqueous mixture of step (a) which is subjected to the heat preservation treatment according to step (b) has a pH of below 8.1 and above Uthell a pH given by the relationship:

$$pH > 0.02 * T(° C.) + 0.23 * (\text{casein micelles in dry weight \%}) + 3.8$$

wherein casein micelles in the relationship are expressed as weight % on total dry weight of the formulation.

2. The process according to claim 1, wherein the aqueous mixture of step (a) which is subjected to the heat preservation treatment according to step (b) has a pH of 6 to below 8.1.

3. The process according to claim 1, wherein prior to the heat preservation treatment according to step (b), the process comprises adding an alkaline or buffering agent to one or more of the components or to the aqueous mixture.

4. The process according to claim 1, wherein the aqueous mixture of step (a) which is subjected to the heat preservation treatment according to step (b) has a pH of 6.2 to 7.5.

5. The process according to claim 1, wherein the heat preservation treatment according to step (b) comprises pasteurisation by heat, sterilisation by heat, or UHT sterilisation treatment.

6. The process according to claim 1, wherein the composition comprises 0.5-3% based on dry weight of the casein micelles.

7. The process according to claim 1, wherein the casein micelles are in the form of dairy protein, concentrated milk, milk, milk powder, skimmed milk powder, butter milk, butter milk powder, milk protein concentrate, and/or mixtures thereof.

8. The process according to claim 1, wherein step (c) comprises packaging the liquid product in a Tetrapak, pouch, bottle, bag, or can.

9. The process according to claim 1, wherein the composition further comprises 0.01-0.1% of a thickening gum which is at least one selected from the group consisting of carrageenan, locust bean gum, guar gum, and tara gum.

10. The process according to claim 1, wherein the starch component comprises maltodextrin.

11. The process according to claim 1, wherein the tryptophan-containing peptide composition comprises a peptide composition having a tryptophan to LNAA (weight) ratio of at least 0.1.

12. The process according to claim 11, wherein the tryptophan-containing peptide composition is obtained by a process which comprises hydrolyzing lysozyme.

13. The process according to claim 12, wherein the lysozyme is hydrolysed to a DH of between 5 and 45.

14. The process according to claim 11, wherein after hydrolysis part of the arginine or lysine containing peptides is removed.

15. The process according to claim 1, wherein the tryptophan-containing peptide composition comprise at least two different di- or tripeptides, whereby two peptides selected from di- or tripeptides are present in an amount of at least 5 mol % of the total amount of di- and tripeptides, and in which tryptophan-comprising peptide composition more than 30 mol % of the peptide-bound tryptophan is present in the form of a di- or a tripeptide.

16. The process according to claim 11, wherein the composition comprises peptides containing the amino acid sequence AW or GNW.

* * * * *